United States Patent [19]
Brown

[11] Patent Number: 4,562,482
[45] Date of Patent: Dec. 31, 1985

[54] COMPUTERIZED EXECUTIVE WORK STATION

[76] Inventor: Robert L. Brown, 8350 Los Coyotes Dr. #13, Buena Park, Calif. 90621

[21] Appl. No.: 518,369

[22] Filed: Jul. 29, 1983

[51] Int. Cl.⁴ .............................................. H04N 5/64
[52] U.S. Cl. ................................... 358/254; 358/255; 312/208; 312/209; 248/639; 400/681
[58] Field of Search ................ 358/254, 255; 340/700; 312/196, 208, 194, 239; 108/92; 248/442.2, 639; 400/681, 691; D6/422–428; D14/103, 104; 179/2 TV, 18 BC

[56] References Cited

U.S. PATENT DOCUMENTS

| D. 236,351 | 8/1975 | Clayton | D14/103 |
| D. 250,335 | 11/1978 | Esslinger et al. | D14/103 |
| D. 257,145 | 9/1980 | Soda | D14/103 |
| 4,345,803 | 8/1982 | Heck | 312/196 |
| 4,400,724 | 8/1983 | Fields | 179/2 TV |

FOREIGN PATENT DOCUMENTS 2847135 5/1980 Fed. Rep. of Germany ...... 340/700

Primary Examiner—Howard W. Britton
Assistant Examiner—John K. Peng
Attorney, Agent, or Firm—Weissenberger & Peterson

[57] ABSTRACT

A computerized executive work station takes the form of an executive-type desk into whose surface a computer display screen and keyboard have been recessed. The screen is disposed at an acute angle to the desk surface and is so positioned with respect to the keyboard that both the keyboard and the screen are concurrently within the field of vision of the near portion of bifocal eyeglasses worn by a person seated at the desk, and at approximately the same distance from that person's eyes. The screen and keyboard are offset from the center of the desk's knee opening so as to preserve a maximum of desk top space within the reach of the person's writing hand. Infrequently used controls, disk drive slots, and the like are mounted on vertical surfaces of the desk so as not to occupy any desk top space; and the screen may optionally be arranged to swing entirely below the desk top so that the screen and keyboard may be covered over for utilization of the entire desk top as a writing surface.

6 Claims, 5 Drawing Figures

COMPUTERIZED EXECUTIVE WORK STATION

FIELD OF THE INVENTION

This invention relates to computer work stations, and more particularly to an executive-type work station designed primarily for conference and paperwork activities in which the computer acts as an unobtrusive secondary information source capable of being easily operated in a visually secure manner during conferences even by persons wearing bifocal eyeglasses.

BACKGROUND OF THE INVENTION

Computer work stations are increasingly being designed in accordance with ergonometric studies which call for the positioning of the display screen to be at the operator's eye level or only slightly lower, and for the keyboard to be in the position generally accepted for the positioning of the typewriter keyboard in a conventional secretarial station. Ergonometric standards for computer work stations have been established by numerous military and civilian agencies and are discussed for example, in *Electronic Design*, Vol. 30, No. 26, pp. 99–100, Dec. 23, 1982 (Hayden Publishing Co., Rochelle Park, N.J., or in *Computers & Electronics*, Vol. 21, No. 4, pp. 42–48, April, 1983 (Ziff-Davis Publishing Co., New York, N.Y.

Unfortunately, these standards, which are increasingly being observed by the computer industry, are not suitable for the needs of a business executive whose use of a computer is limited to the occasional retrieval of data in the course of a conference. In that environment, it is awkward for the executive to have a separate computer work station at his side or behind him because in order to use it, the executive needs to lose eye contact with the conferee, and the conferee can see the data displayed on the screen. It is also generally awkward for many executives to operate a computer designed in accordance with accepted ergonometric standards because the bifocal glasses worn by many executives require considerable head movement as the executive's glance is shifted between the screen and the keyboard. This problem is exacerbated by the fact that most executives have limited typing skills and therefore need to constantly look at the keyboard.

SUMMARY OF THE INVENTION

The present invention provides a computer work station mounted in a conventional executive desk in such a way that both the display screen and the keyboard are within the normal sharpness range of the near portion of bifocal glasses worn by a person sitting at the desk and looking generally across the desk at a person sitting on the other side. For this purpose, the display screen is positioned partially below the desk level at an angle of approximately 50° to the horizontal, and the keyboard is located immediately in front of the screen below the desk level, and in fact somewhat below the normal typewriter keyboard height.

In accordance with a further aspect of the invention, additional controls, displays, and peripheral equipment may be located in portions of the desk where they are generally out of sight and do not interfere with the appearance of the desk as a piece of furniture.

In accordance with still another aspect of the invention, the screen may be made capable of being moved entirely below the desk surface so as to permit the work station to be covered to present an entirely flat desk surface.

It is therefore the object of the invention to provide a computer work station specifically adapted for use as a secondary data source in a face-to-face executive conference, and specifically adapted for use in the course of such a conference by a person wearing bifocals and having limited typing skills.

DESCRIPTION OF THE PREFERRED EMBODIMENT

Figure 1:
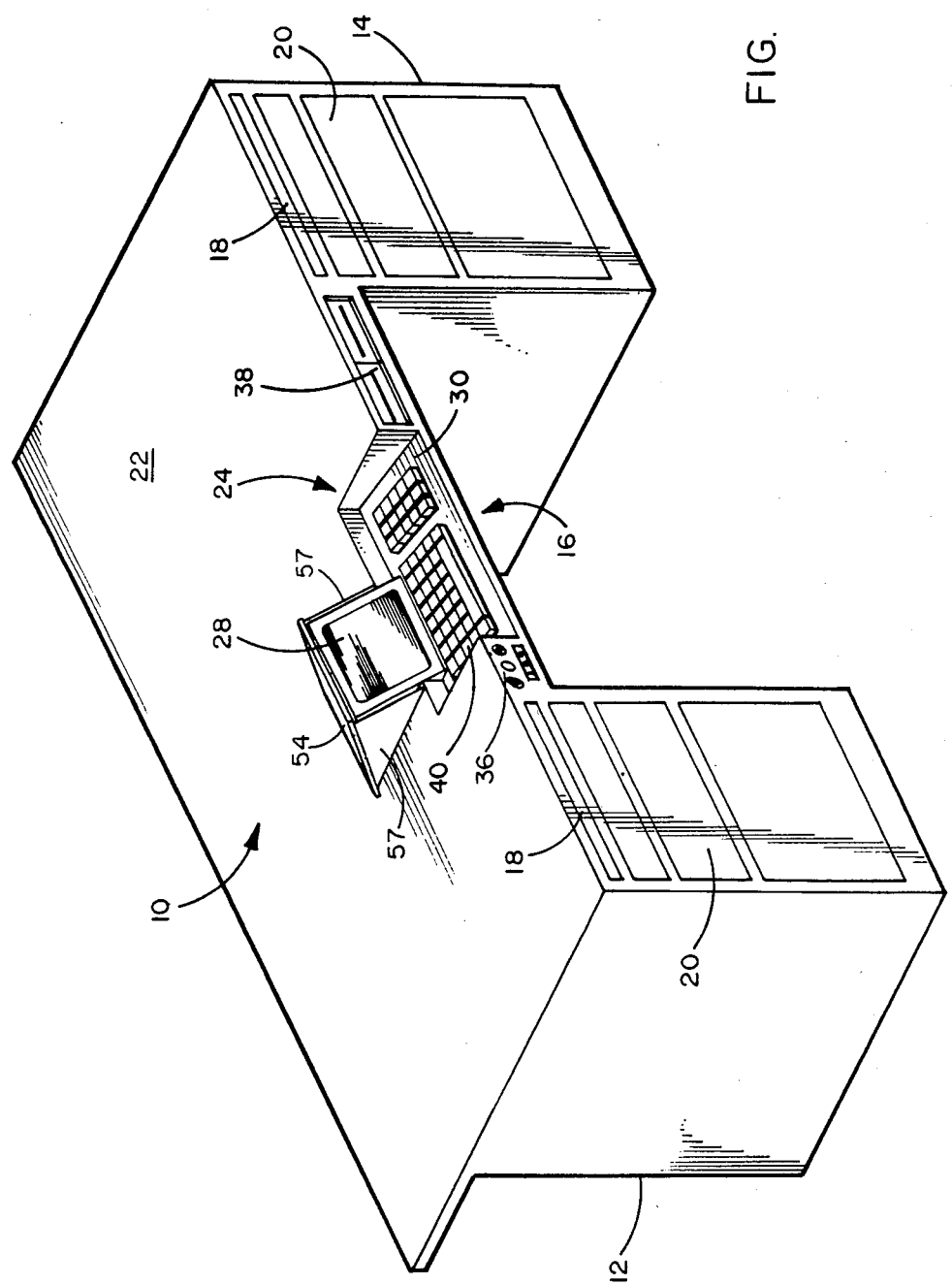
FIG. 1 is a perspective view of the executive work station of this invention.
Figure 2:
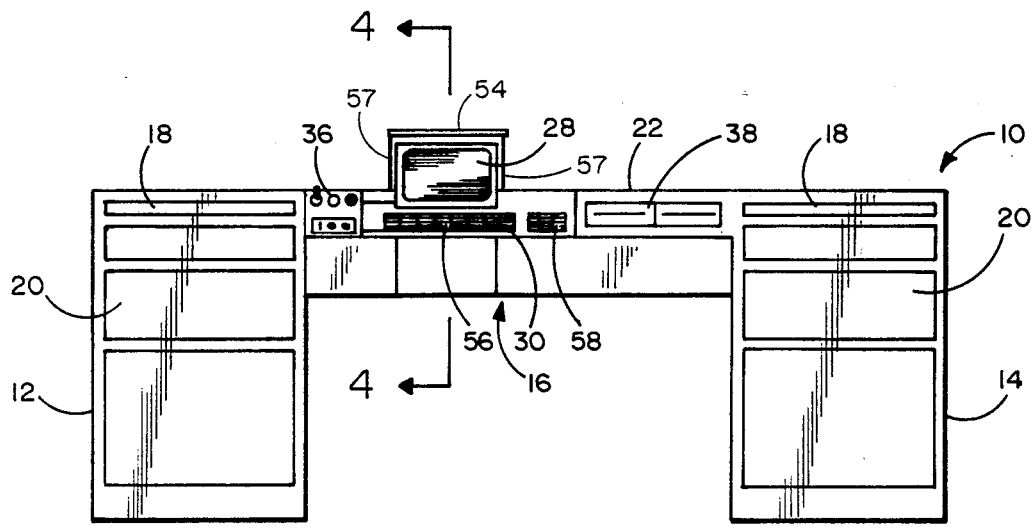
FIG. 2 is a front elevation of the work station of FIG. 1.

As best shown in FIGS. 1 and 2, the work station 10 of this invention consists essentially of an executive-type desk with a pair of conventional pedestals 12, 14 and a modified center section 16. The pedestals 12 and 14 may contain the usual complement of writing boards 18 and drawers 20, or they may contain appropriate computer peripherals such as printers or hard disk drives (not shown).

The desk of this invention is covered by a desk top 22 which provides the customary expansive writing areas commonly found on executive type desks. In accordance with the invention, however, the desk top 22 is cut out, as best shown at 24 in FIG. 3, to accommodate a cathode ray tube 26 with a screen 28 and a keyboard 30. The screen 28 and the keyboard 30 are recessed below the desk top 22 for purposes hereinafter described.

The center section 16 of the desk or work station 10 differs from the usually accepted type in that its forward portion 32 is sufficiently shallow to accommodate a person's knees below it, but the rear portion 34 slopes downwardly rearwardly and eventually becomes sufficiently deep to accommodate the electronics associated with the screen 28 and keyboard 30 and, in the alternative embodiment of FIG. 5, even the cathode ray tube 26 itself.

The screen 28 and keyboard 30 occupy a portion of the volume normally occupied by the center drawer of a conventional executive-type desk. The remaining portion of that volume may be occupied in the desk of the invention by auxiliary controls or displays 36, and/or by floppy disk drives 38.

Figure 4:
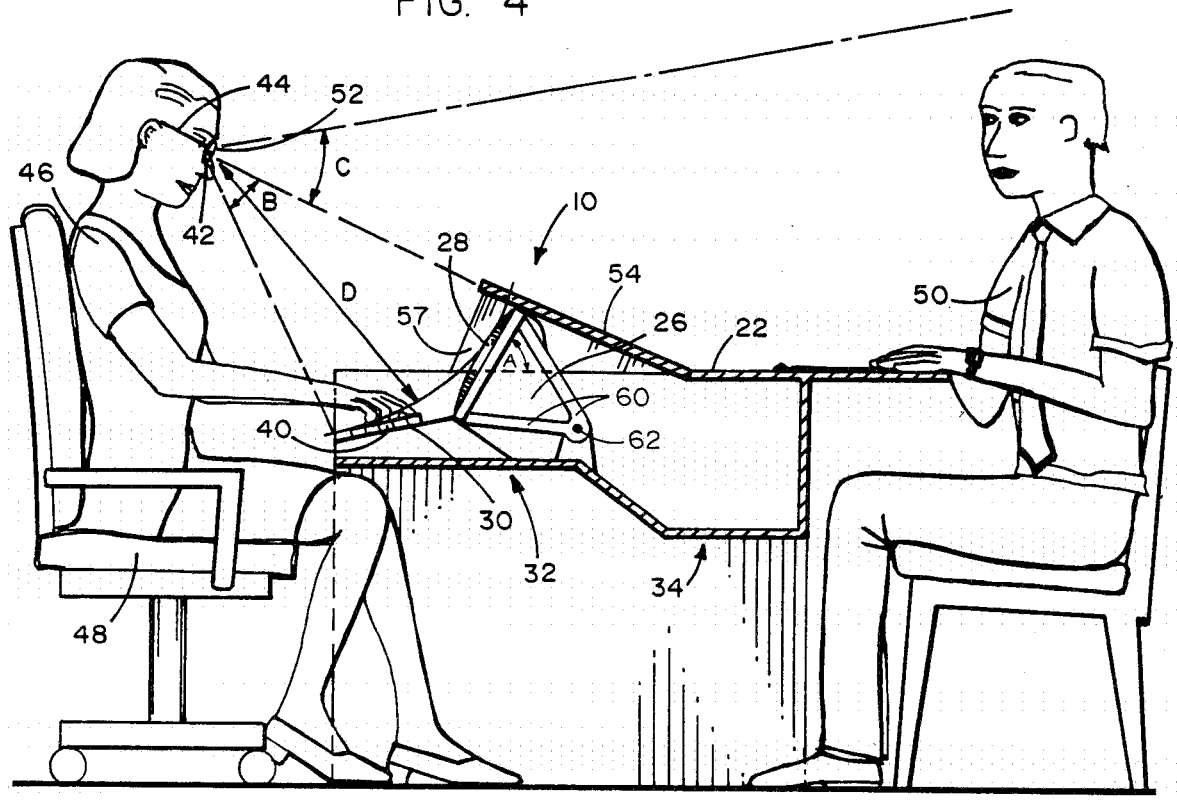
FIG. 4 is a vertical section of the work station of this invention along line 4—4 of FIG. 2.

The inventive arrangement of the center section 16 is best shown in FIG. 4. In that figure, it will be seen that the screen 28 is disposed at an angle A of about 50° to the desk top 22 and lies partially below the level of desk top 22. The keyboard 30 is positioned directly in front of the screen 28. The keyboard 30 is preferably also disposed at an angle to the horizontal, albeit a smaller one than the angle A. The dimensions of the screen 28 and keyboard 30 are such that the area from the top of screen 28 to at least the home row 40 of the keys of keyboard 30 is within the visual angle B of the near portion 42 of conventional bifocal eyeglasses 44 worn by a person 46 sitting in an executive chair 48 in front of the desk 10. The angle B is conventionally on the order of about 40°; consequently, the distance between the top of screen 28 and the home row 40 of the keys of keyboard 30 is dictated generally by the optimum focal distance D of the near portion 42 (usually about 47 cm).

Under these circumstances, the screen 28 is generally in the position in which a letter would be while being read by the person 46 at the desk 10. At the same time, a person 50 sitting opposite the person 46 on the other side of the desk would be within the visual angle C of the distant portion 52 of bifocal eyeglasses 44. Consequently, the arrangement of FIG. 4 enables the person 46 to operate the keyboard 30 and read the data on screen 28 without substantially losing eye contact with the person 50 seated across the desk 10.

Figure 3:
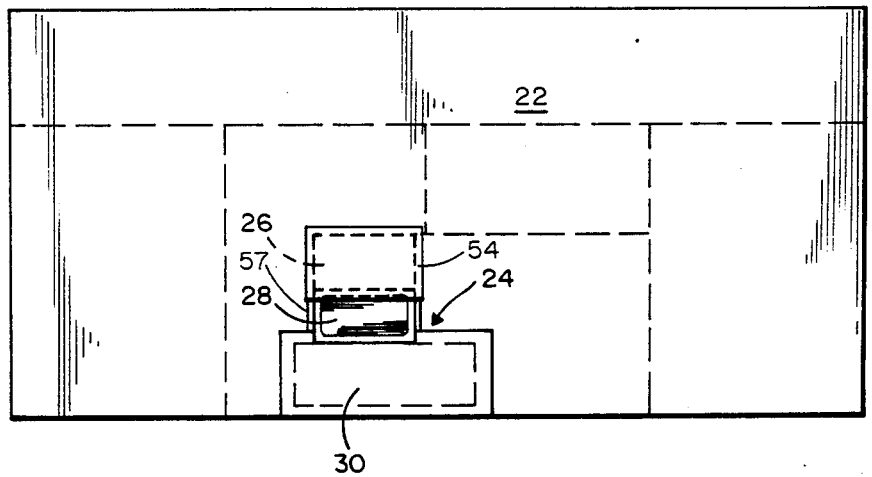
FIG. 3 is a plan view of the work station of FIG. 1

It will be noted in FIGS. 2 and 3 that the recessed portion 24 is located substantially toward the left side of the center portion 16. This arrangement allows the person 46 to operate the keyboard 30 with only a slight shift to the left, yet to conveniently use the areas to the right of the recess 24 as a writing surface. It will be understood that for left-handed persons 46, the arrangement may be reversed.

Figure 5:
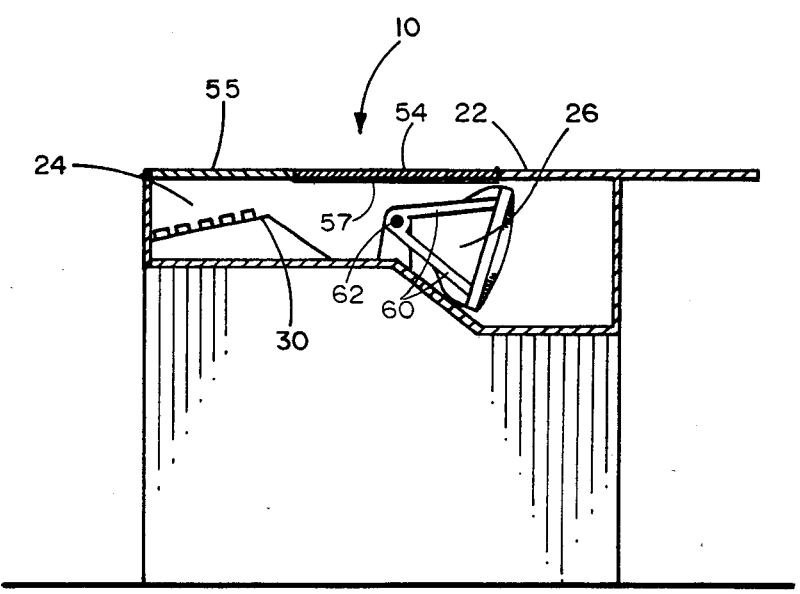
FIG. 5 is a vertical section similar to FIG. 4 but showing the work station's computer elements in stowed-away position.

Referring to FIGS. 4 and 5, the cathode ray tube 25 may be so mounted as to be retractable from the position of FIG. 4 into the position of FIG. 5 by pivoting its mounting arms 60 about a pivot bracket 62. When the cathode ray tube 26 is in the position of FIG. 5 and the keyboard 30 is not in use, the screen portion of the recess 24 may be covered by an appropriate desk top section 54. In addition, the keyboard portion of recess 24 may be covered by a removable cover 55 so that the keyboard and screen may be separately covered. In this manner the entire top surface of desk 10 can selectively be made into a smooth, unitary writing surface. In the position of FIG. 4, the section 54 may overlie the tube 26 to shield it from the glare and reflection of overhead lights. In that position, the section 54 may be supported on the desk surface 22 by folding legs 57.

It will be appreciated that the present invention provides an executive work station which allows the person 46 to gather and examine computerized data while conferring with a conferee 50, without exposing the data to the view of the conferee 50 and without breaking the eye contact communication with the conferee 50 by excessive head movements or by the need to turn away to examine data on a separate computer screen. The particular positioning of the screen 28 and keyboard 30 makes it possible to use those elements with a minimum of vertical head movement even if the person 46 needs to wear bifocal eyeglasses and needs to see the keyboard in order to operate it.

The keyboard 30 may advantageously have a general-purpose section 56 which includes the usual typewriter characters, as well as a less frequently used special-purpose section 58 which contains the control keys controlling various computer functions. In order to improve the ease of operation of the keyboard 30 and retain a maximum of writing surface conveniently accessible to the person 46, the screen 28 is preferably centered with respect to the general-purpose section 56 of keyboard 30.

I claim:

1. An executive work station comprising:
 (a) a desk top surface;
 (b) keyboard means positioned below the level of said desk top surface;
 (c) display screen means positioned at an acute angle to said desk top surface, the bottom edge of said display screen means being adjacent the top edge of said keyboard means; and
 (d) said screen means and said keyboard means being positioned substantially equidistantly from the eyes of a person seated at said work station, and said screen and keyboard means, when so positioned, being substantially within the angle subtended by the near portion of bifocal eyeglasses worn by said person when the field of view of the far portion thereof is sutstantially horizontal.

2. An executive work station comprising:
 (a) a desk top surface;
 (b) keyboard means positioned below the level of said desk top surface;
 (c) display screen means positioned at an acute angle to said desk top surface, the bottom edge of said display screen means being adjacent the top of said keyboard means; and
 (d) the angle between the top of said screen means and the bottom of said keyboard means as seen from a point about 40 cm above and about 15 cm in front of said bottom being on the order of 40°.

3. An executive work station comprising:
 (a) a desk top surface;
 (b) keyboard means positioned below the level of said desk top surface;
 (c) display screen means positioned at an acute angle to said desk top surface, the bottom edge of said display screen means being adjacent the top edge of said keyboard means;
 (d) means for selectively moving said screen means to lie wholly below said desk top surface; and
 (e) means for extending said desk top surface to overlie said screen and keyboard means, said last-named means being positioned, when said screen means extend above said desk top surface, to serve as a light shield for said screen means.

4. An executive work station comprising:
 (a) a desk top surface;
 (b) keyboard means positioned below the level of said desk top surface;
 (c) display screen means positioned at an acute angle to said desk top surface, the bottom edge of said display screen means being adjacent the top edge of said keyboard means; and
 (d) said keyboard means having a principal key area and a secondary key area, and said display screen means being centered with respect to said principal key area.

5. An executive work station comprising:
 (a) a desk top surface;
 (b) keyboard means positioned below the level of said desk top surface;
 (c) display screen means positioned at an acute angle to said desk top surface, the bottom edge of said display screen means being adjacent the top edge of said keyboard means; and
 (d) said screen means being inclined at an angle of substantially 50° to the horizontal.

6. The work station of claim 5, in which said screen means include a cathode ray tube, and said screen and keyboard means are sufficiently spaced from the front edge of said work surface so that the neck of said cathode ray tube is beyond the knees of a person seated at said work station.

* * * * *